June 16, 1964  A. E. MARTIN ETAL  3,137,757
APPARATUS FOR THE ANALYSIS OF SUBSTANCES
BY ABSORPTION OF RADIATION
Filed Feb. 4, 1959
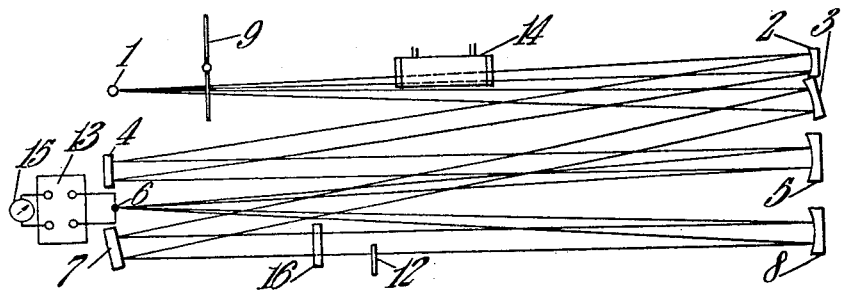
Fig. 1.
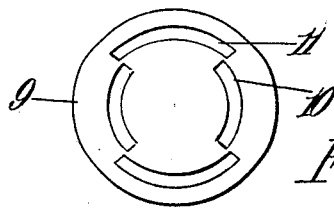
Fig. 1a.
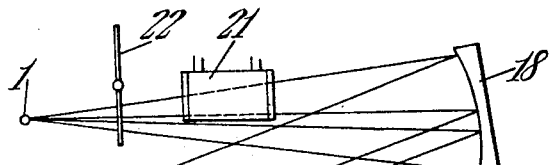
Fig. 2.
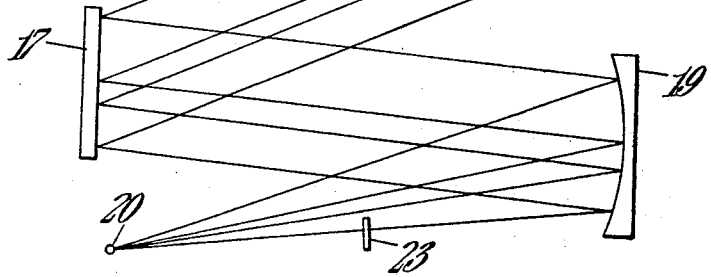
Inventors
A. E. Martin
J. Shields
By Ellscott Downing Leebold
Attys.

3,137,757
APPARATUS FOR THE ANALYSIS OF SUBSTANCES BY ABSORPTION OF RADIATION
Albert E. Martin and John Shields, Newcastle-upon-Tyne, England, assignors to Sir Howard Grubb Parsons & Company Limited, Newcastle-upon-Tyne, England
Filed Feb. 4, 1959, Ser. No. 791,191
Claims priority, application Great Britain Feb. 7, 1958
1 Claim. (Cl. 88—14)

This invention relates to apparatus for the analysis of substances by absorption of radiation, particularly infra-red radiation. A common form of such apparatus is the infra-red gas analyzer in which a gas sample under test is subjected to infra-red radiations which subsequently enter a detector to give an indication of the absorption of the radiations by the gas.

In a typical instrument infra-red rays are passed in two beam paths, each containing a gas-filled tube, the rays afterwards acting upon the contents of two detecting chambers partitioned from each other by a thin metal diaphragm adjacent to a fixed electrode. The two chambers are filled with gas to be detected and energy is absorbed as radiation passes through them according to the nature of infra-red absorption of the gas in question, and as the gas heats up an increase of pressure is produced and any difference of pressure between the two chambers causes the diaphragm to deform and so gives rise to change of capacitance with respect to the electrode which is usually an insulated, perforated metal plate which is fixed in close proximity to the diaphragm. If the tube in each path contains gas with no infra-red absorption and the radiation is interrupted by a rotating shutter which admits radiation simultaneously to the tubes in each path, the pressure pulses in the chambers can be balanced by means of a trimming shutter and no movement of the diaphragm will result, but if some of the gas to be detected is passed into the absorption tube in one beam path energy will be absorbed before it can reach the corresponding detecting chamber, the balance will now be upset and the diaphragm will vibrate at the frequency of interruption of the radiation. The capacitance changes are amplified electronically and finally an indication is obtained on a meter which can be calibrated in gas concentration.

Detectors of the kind described above are usually fragile, easily upset and require a gap between the diaphragm and the electrode of the order of 1,000th of an inch. Further a high insulation resistance is required.

Analyzers have been proposed which provide means for isolating a wavelength band from the radiation corresponding to a band strongly absorbed by the component to be detected in the sample and in such instances a non-selective detector may be used. Such non-selective detectors are usually simpler and more robust than the detectors described above. In these instruments D.C. or A.C. signals may be obtained from the detectors. A.C. signals have many advantages from the point of view of ease of amplification. To obtain an A.C. signal, it is known to use two optical paths and switch radiation from each path alternately onto the detector. In a known instrument the beam switching device consists of a rotating mirror. Such a mirror is usually made from glass and the size of the driving motor required is larger than that which would be required to drive a rotating shutter say in the form of a thin apertured disc. Metal mirrors can be used but difficulties arise in obtaining an optically flat metal surface. In addition the need to avoid warping of the metal means that limits are imposed on the minimum thickness of the mirror. Difficulties are also met in making mirrors capable of rotating at high speeds to produce high chopping frequencies, whereas with an apertured disc this can largely be overcome by increasing the number of apertures.

The object of the present invention is to provide an analyzer with means for isolating wavelengths as described above and producing A.C. signals but which is devised so that a simple beam switching device in the form of a rotating shutter can be used.

The invention consists of means for analyzing substances by absorption in the ultra-violet, visible or infrared region of the spectrum comprising means forming two beam paths of radiation, means in one path for containing a sample under analysis, wavelength selection means in each path, the said means in at least the sample path being constituted by a diffraction grating, said selection means in the sample path selecting a wavelength band strongly absorbed by the component to be detected in the sample, the selection means in the other path selecting a wavelength band coincident with or in the region of the band selected in the sample path, collimating means directing radiation in a path onto at least the diffraction grating part of the wavelength selection means, a radiation detector, means focussing both beams from said wavelength selection means onto said detector, a shutter in one path adapted to move into or out of said beam path to adjust the energy falling on the detector from said path whereby the energy falling on the detector from each path can be equalized with no sample present and beam chopping means interrupting each beam alternately whereby the detector receives radiation from each beam path alternatively a number of times a second.

The invention also consists of means for analyzing substances by absorption of infrared radiation as set forth in the preceding paragraph in which the wavelength selection means comprise a diffraction grating in the sample path and a mirror and selective filter in the other path.

The invention further consists of means for analyzing substances by absorption in the ultra-violet visible or infra-red region of the spectrum comprising a source of radiation, a diffraction grating for selecting a wavelength band strongly absorbed by the component to be detected in the sample, collimating means receiving radiation from said source and directing it onto said diffraction grating, a radiation detector, means focussing radiation from said diffraction grating onto said detector, radiation chopping means interrupting said radiation to pass first one part of the beam from said source and then another part of the beam alternately so that the detector receives radiation from each part alternately a number of times a second, a container for the sample under analysis located in the path of one of said parts of the beam and a shutter in the other part of the beam adapted to adjust the amount of energy falling on the detector from said part so that the energy received from each part is equal when no sample is present.

The invention will now be described, by way of example, with reference to the diagrammatic drawings, in which FIGURE 1 shows a diagram of the invention when applied in an infra-red analyzer.

FIGURE 1a shows a form of rotating sector;

FIGURE 2 shows a form of the invention using a single grating;

As shown, infra-red radiations from a source 1 fall on spherical mirrors 2 and 3 each of which produces a parallel beam of radiation.

The beam from mirror 2 is directed on to the surface of a plane diffraction grating 4 of the reflecting type from which a parallel diffracted beam is directed on to a spherical mirror 5. Mirror 5 focusses the beam on to a detector 6. The beam from mirror 3 is directed on to a surface 7 which is a reflecting mirror in the form shown but it may be a selective reflector, diffraction grating or combination of mirror and interference or other filter. The reflected beam from surface 7 is directed on to a spherical mirror 8 from which it is focused on detector 6. A rotating sector 9 interrupts each beam so that the detector receives radiation from each beam alternately. A suitable form of rotating sector is shown in FIGURE 1a consisting of arcuate apertures 10 and 11 at different radii, so that one beam passes through one set of apertures 10 while the second beam passes through the alternative apertures 11.

The radiations from diffraction grating 4 received by the detector will be composed of wavelengths $\lambda$, $\lambda/2$, $\lambda/3$, etc. where the value of $\lambda$ in microns is determined by the grating equation $d(\sin \theta_1 + \sin \theta_2) = n\lambda$, where $d$ is the grating spacing, $\theta_1$ is the angle of incidence of the radiation falling on the grating, $\theta_2$ is the angle of diffraction of the radiation leaving the grating (negative in FIGURE 1), and $n$ is the order of diffraction of the spectrum. By suitable adjustment of shutter 12 in one or other of the two beams energy received from the plane reflector or grating 7 by the detector 6 can be made exactly equal to the energy received from diffraction grating 4 so that no alternating component is obtained from the detector 6 and associated A.C. amplifier 13.

If now a sample is introduced into the first radiation path into sample tube 14, that is to say, the path incorporating the diffraction grating 4, energy will be absorbed provided that some component of the gas in question has absorption at one or more of the wavelengths $\lambda$, $\lambda/2$, $\lambda/3$, etc. and an output signal will be received from detector 6. After amplification the signal can be measured with meter 15 and the deflection will depend on the concentration of the component of interest in the gas sample.

To obtain a useful result at least one of the wavelengths diffracted from the diffraction grating 4 should be strongly absorbed and in addition it is also advantageous to use a wavelength in that part of the spectrum strongly emitted by source 1.

The more closely the distribution of the wave-lengths in the two radiation beams approach one another the less will the instrument be affected by changes in temperature of the source, with consequent change in distribution of radiated wavelengths. The energy associated with a given wavelength will change with temperature equally in both paths and also the instrument will be unaffected by absorption in the optical paths, e.g., by water vapour or atmospheric $CO_2$, provided that the two paths are of equal length. It is, however, not always necessary to match the wavelength distribution of the two paths exactly, although reasonable correspondence in wavelength is advisable. For example, if the radiation diffracted from diffraction grating 4 contains wavelengths 7 microns, 7/2 microns, 7/3 microns etc. and suppose that the sample absorbs at 7 microns only, then the sum of energies associated with wavelengths 7 microns, 7/2 microns, 7/3 microns etc. in the first beam can be made equal to a single wavelength region, several wavelengths or narrow bands of wavelengths in the second beam isolated by means of a grating, selective reflector or, as shown in FIGURE 1, mirror 7 in conjunction with a filter 16.

For example the energy from the grating 4 might be balanced by a narrow band of wavelengths about $5\mu$, and by judicious selection the temperature dependence might be made equal to the average dependence for 7, $7/2$, $7/3\mu$, etc.

With the arrangement described above the instrument will have good characteristics since with no absorbing sample gas the output signal will be zero and will increase progressively as the concentration rises, while if high sensitivity is required it is only necessary to increase the gain of amplifier 13.

In the special case where elements 4 and 7 are identical gratings, provided that $\sin i_1 + \sin i_2$ for grating 4 is equal to $\sin i_1' + \sin i_2'$ for grating 7, where $i_1'$ and $i_2'$ are the corresponding values of $i_1$ and $i_2$ for grating 7, any one order of diffraction can be cancelled out and the remaining orders will compensate to a large extent, so that there is no difficulty in making the total energy in the various orders from one grating equal to the total energy in the same orders from the other grating. When $i_1 = i_1'$ and $i_2 = i_2'$, each order can be made to compensate individually.

While the instrument as described has no entrance or exit slit, these can easily be included if an improved optical performance is desired, although at the cost of reduced energy.

The optical arrangement can be simplified as shown in FIGURE 2. If elements 4 and 7 of FIGURE 1 are identical gratings for example, they can be replaced by a single grating 17. Radiation from a source 1 is directed on to mirror 18 which in turn reflects a parallel beam of radiation onto grating 17. Radiation diffracted from grating 17 is received by mirror 19 and focussed on detector 20. The sample cell 21 is located so that part of the radiation from source 1 passes therethrough and between the sample cell and the source there is arranged a rotary chopper 22 which has apertures such that the radiation passing through the sample cell and that bypassing the sample cell are interrupted alternately. A shutter 23 is located in one beam path to equalize the energy when there is no sample in the sample cell.

The grating 17 may consist of two similar but not identical gratings arranged alongside or above each other.

While the instrument is primarily intended for use with infra-red radiations it can equally well be employed for the visible and ultra-violet regions of the spectrum provided that the source of radiations, detector and optical components are adapted for use in these regions.

Further while the instrument as described is essentially a direct deflection analyzer, it can readily be converted into a null-balance instrument by using the output signal, after appropriate amplification to operate an optical attenuator replacing or addition to shutters 12 or 23.

By using arrangements such as described a simple and robust instrument can be produced, particularly if a photoconductive cell or magneto-photoelectric cell, e.g., indium antimonide, is employed. Other known forms of detector such as a thermocouple, bolometer or Golay cell can be used if desired.

The fact that a simple rotating shutter such as an apertured disc can be used for beam switching means that a smaller driving motor can be used compared with instruments where rotating or reciprocating mirrors are used to switch the beams, as the shutter can be made very thin.

Further in the above examples the radiation has been described as coming from a single source but of course it will be appreciated that two sources may be used.

Various modifications may be made to the invention in order to suit varying requirements.

We claim:

Means for analyzing substances by absorption in the ultra violet, visible or infrared region of the spectrum comprising, a source of radiation, a detector sensitive to said radiation, the operative components between said source and detector consisting, in the order named, of a rotary apertured shutter constituting the sole means serving the dual purpose of forming two beam paths for the radiation from the source and interrupting each path alternately, a container for a sample under test interposed in one beam path, a collimating element for at least the beam containing the sample, stationary wavelength selection means in the path of both beams, comprising a single diffraction grating for selecting a wavelength band strongly absorbed by the component to be detected in the sample, a focussing element receiving radiation from the wavelength selection means and focussing it on the detector, and an adjustable shutter positioned in one of the beam paths to equalize the energy received by the detector from the two beam paths in the absence of the sample.

References Cited in the file of this patent

UNITED STATES PATENTS

| | | |
|---|---|---|
| 1,746,525 | Darrah | Feb. 11, 1930 |
| 1,919,182 | FitzGerald | July 18, 1933 |
| 2,073,223 | Rose | Mar. 9, 1937 |
| 2,408,023 | Kruper | Sept. 24, 1946 |
| 2,439,373 | Stearns | Apr. 6, 1948 |
| 2,503,165 | Meyer | Apr. 4, 1950 |
| 2,605,671 | Canada | Aug. 5, 1952 |
| 2,941,444 | Frykman | June 21, 1960 |